United States Patent [19]

Downer et al.

[11] Patent Number: 4,700,094
[45] Date of Patent: Oct. 13, 1987

[54] MAGNETIC SUSPENSION SYSTEM

[75] Inventors: James R. Downer, Cambridge; David B. Eisenhaure, Hull; George Oberbeck, East Walpole; Tim E. Bliamptis, Lexington, all of Mass.; Susan D. Hendrie, Milan, Italy

[73] Assignee: The Charles Stark Draper Laboratory, Inc., Cambridge, Mass.

[21] Appl. No.: 889,583

[22] Filed: Jul. 22, 1986

Related U.S. Application Data

[63] Continuation of Ser. No. 682,411, Dec. 17, 1984, abandoned.

[51] Int. Cl.⁴ .................................................. F16C 39/06
[52] U.S. Cl. .................................... 310/90.5; 310/74
[58] Field of Search ................... 310/90.5, 74, 153; 74/546, 547; 244/166, 165

[56] References Cited

U.S. PATENT DOCUMENTS

| | | | |
|---|---|---|---|
| 3,787,100 | 1/1974 | Habermann | 308/10 |
| 3,845,995 | 11/1974 | Wehde | 308/10 |
| 3,955,858 | 5/1976 | Poubeau | 308/10 |
| 4,154,489 | 5/1979 | Lyman | 308/10 |
| 4,211,452 | 7/1980 | Poubeau | 308/10 |
| 4,363,525 | 12/1982 | Poubeau | 308/10 |
| 4,444,444 | 4/1984 | Benedetti | 308/10 |
| 4,470,644 | 9/1984 | Weisser | 308/10 |
| 4,483,570 | 11/1984 | Inoue | 308/10 |

OTHER PUBLICATIONS

"Factors Affecting the Control of a Magnetically Suspended Flywheel"; D. Eisenshure et al; 1980 Flywheel Tech. Symp., pp. 389-391.
"Analytical Techniques of Magnetic Bearings"; A. V. Sabnis; U-Cal.-Berkley, 1974; Ph.D. Thesis; Sect. 6.3, pp. 122-128.
"Operational Amplifiers: Theory and Practice; J. K. Roberge; (1975) pp. 214-217; John Wiley & Sons, New York.
Magnetic Bearing Momentum Wheels with Magnetic Gimballing Capability for 3-Axis Active Attitude Control & Energy Storage; Nov. 1977; R. S. Sindlinger; Teldix; Heidelberg, Germany.
Physics, Part II; D. Halliday, R. Resnick; John Wiley & Sons, p. 820, New York, London, Sidney.

Primary Examiner—R. Skudy
Attorney, Agent, or Firm—Joseph S. Iandiorio; Douglas E. Denninger

[57] ABSTRACT

A magnetic suspension system including a first control coil for establishing circumferential current flow, and second and third control coils for establishing axial current flow. A support member of magnetic material has a gap for receiving the coils and there is a magnet for producing a magnetic field in the support member through the gap in the coils for generating Lorentz forces to support the coils in the axial and two mutually perpendicular radial directions.

17 Claims, 10 Drawing Figures

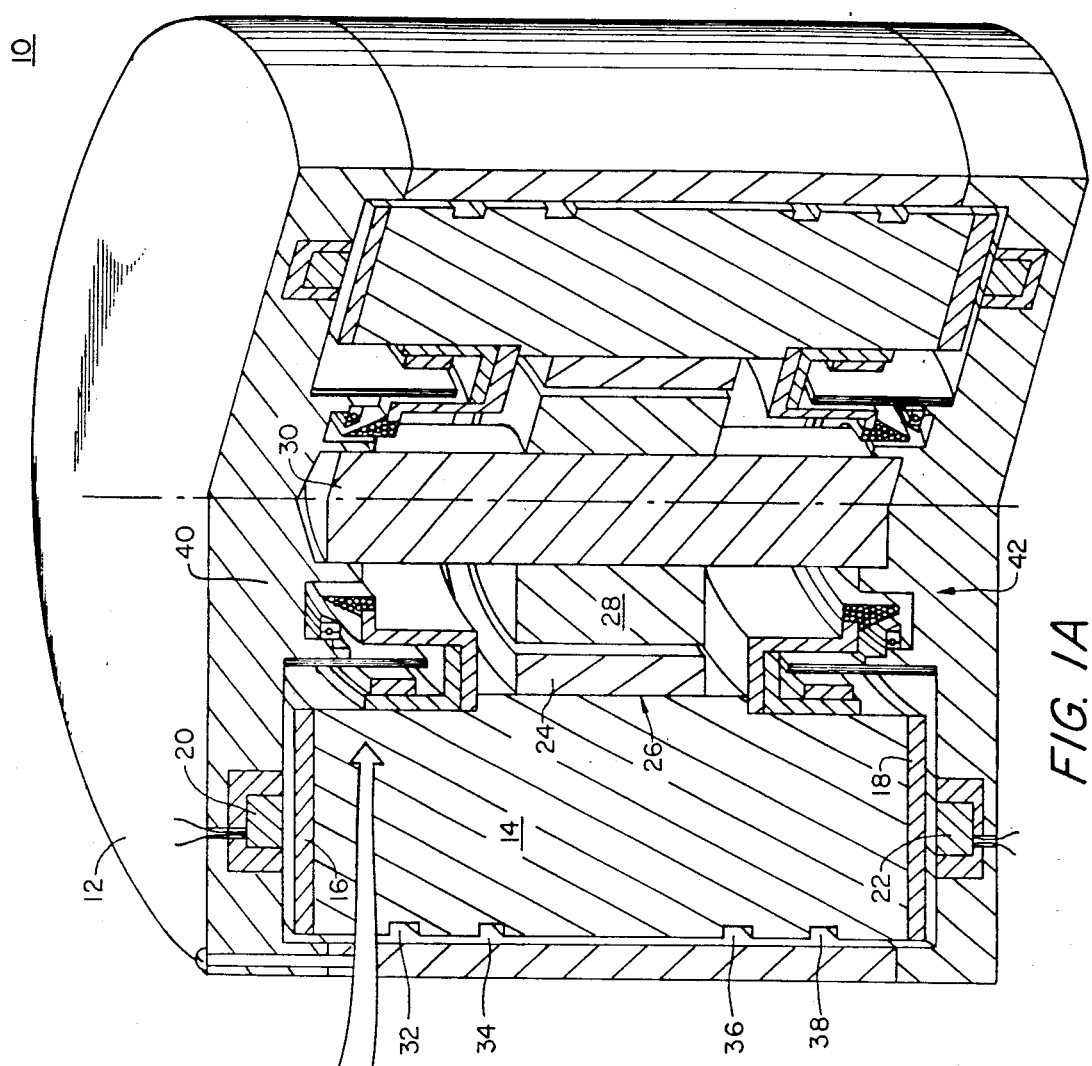
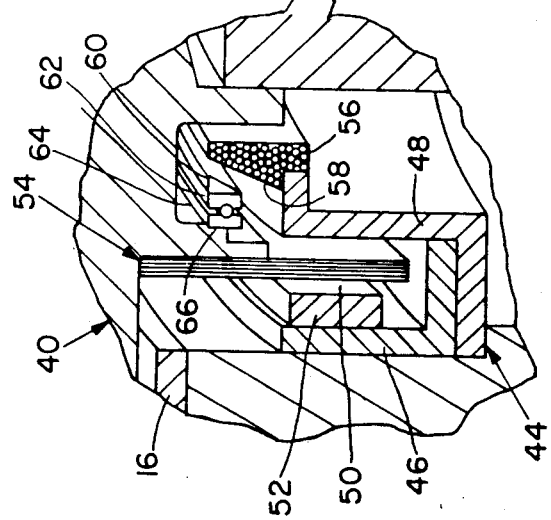
FIG. 1A
FIG. 1B

//  4,700,094

MAGNETIC SUSPENSION SYSTEM

This is a continuation of application Ser. No. 682,411, filed Dec. 17, 1984 (now abandoned).

FIELD OF INVENTION

This invention relates to an improved magnetic bearing, and more particularly to one which employs Lorentz forces for suspension.

BACKGROUND OF INVENTION

Conventional magnetic bearings employ magnetic attraction forces to suspend the moving portion by monitoring the position of the moving portion to the bearing and increasing or decreasing the holding current to maintain the proper suspension distance. Such magnetic bearings have an inherent shortcoming resulting from the unstable spring effect. That is, this type of magnetic bearing attracts the suspended portion more and more strongly as the suspended portion becomes distorted and moves closer to the bearing. To accommodate for this, complex, high-gain control equipment is necessary. Attraction-type magnetic bearings are inherently non-linear, which is not desirable. Another type of magnetic bearing suspension, passive suspension, is relatively soft and is unstable in at least one axis. Repulsion magnetic systems have been used for suspension, but not bearings; these are not closely controllable and have large power requirements.

SUMMARY OF INVENTION

It is therefore an object of this invention to provide an improved magnetic bearing.

It is a further object of this invention to provide a simple, easily controllable, efficient and stable magnetic bearing.

It is a further object of this invention to provide such a magnetic bearing with relatively stiff suspension.

It is a further object of this invention to provide such a magnetic bearing which is generally linear and stable.

It is a further object of this invention to provide such a magnetic bearing which has very little coupling among the three axes.

It is a further object of this invention to provide such a magnetic bearing which enables the use of large air gaps which result in more reasonable manufacturing tolerances and enables tilting of the rotor, which may be desirable in some applications such as in gimballed gyros.

The invention features a magnetic suspension system including a first control coil for establishing circumferential current flow, and second and third control coils for establishing axial current flow. There is a support member of magnetic material with a gap for receiving the coils. A magnet produces a magnetic field in the support member through the gap and coils for generating Lorentz forces to support the coils in the axial and two mutually perpendicular radial directions.

In a preferred embodiment, either the coils or the support member is fixed and the other rotates relative to it. The coils may be mounted to the stator and the support member to the rotor of a rotary machine. The magnet may be disposed in the gap and may be a permanent magnet, such as a rare earth cobalt magnet. The suspension system may be used as a rotary bearing installed in pairs on a rotary machine.

DISCLOSURE OF PREFERRED EMBODIMENT

Other objects, features and advantages will occur from the following description of a preferred embodiment and the accompanying drawings, in which:

FIG. 1A is a cutaway axonometric view showing a section through a flywheel energy storage unit;

FIG. 1B is an enlarged view of one of a magnetic bearing according to this invention shown in FIG. 1A;

Figure 7:
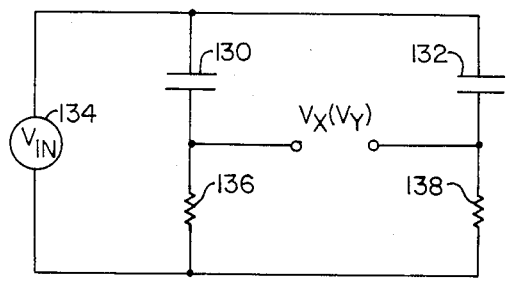
FIG. 7 is a schematic of a bridge circuit which produces a voltage signal representaive of the radial displacement of the rotor for the sensor of FIG. 6.
Figure 8:
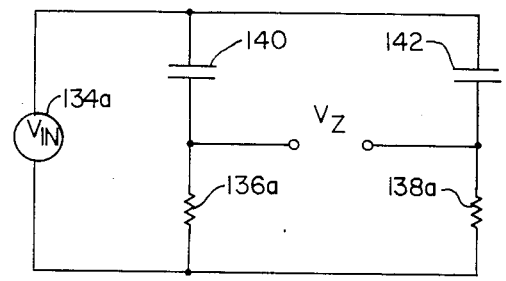
FIG. 8 is a schematic of the bridge circuit which produces a voltage representative of the axial position of the rotor relative to the housing by the sensor of FIG. 6.

There is shown in FIGS. 1A and 1B an energy storage flywheel system 10 which includes a stationary housing 12 in which is rotatable a non-magnetic flywheel 14. At either end of flywheel 14 there are magnetic plates 16 and 18 which interact with electrically controlled annular locking magnets 20, 22 for securing the flywheel 14 in certain applications. Flywheel 14 is attached to the rotor 24 of motor 26, which also includes stator portion 28 mounted on stationary center shaft 30. Grooves 32, 34, 36, and 38 cooperate with printed circuit material to form a position sensor, which is explained more fully in FIGS. 6, 7 and 8. System 10 includes two magnetic bearings 40, 42, one of which 40, is shown enlarged. Each bearing 40, 42 includes a support member, channel 44, formed of magnetic material in two parts: the magnet housing 46 and center pole 48. Channel 44 is mounted for rotation with rotor 14. There is a gap 50 in channel 44 in which is located magnet 52, and control coil structure 54, which is attached to the housing 12. Magnet 52 may be an electromagnet or a permanent magnet of the rare earth cobalt type (for example it may be made of a Samarium cobalt material). Coupled to center pole 48 is a hardened member 56 with a slanted bearing surface 58 that receives the wedge-shaped mounting 60 of inner race 62 of ball bearing 64 if the magnetic bearing system fails. In that event, channel 44 moves upward in the enlarged view until bearing surface 58 firmly engages the surface of wedge 60, and then the inner race 62 and outer race 66 of ball bearing 64 assume the bearing function for the system. Depending upon the mode of failure, either ball bearing 64 in magnetic bearing 40 or the counterpart ball bearing in magnetic bearing 42 will assume the load.

Figure 2:
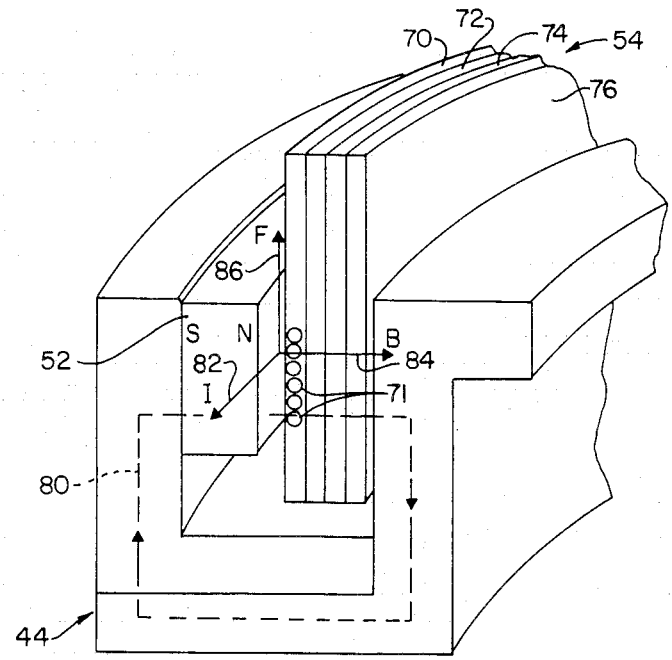
FIG. 2 is an enlarged schematic view of one of the bearings according to this invention showing the generation of the axial suspension Lorentz force.
Figure 3:
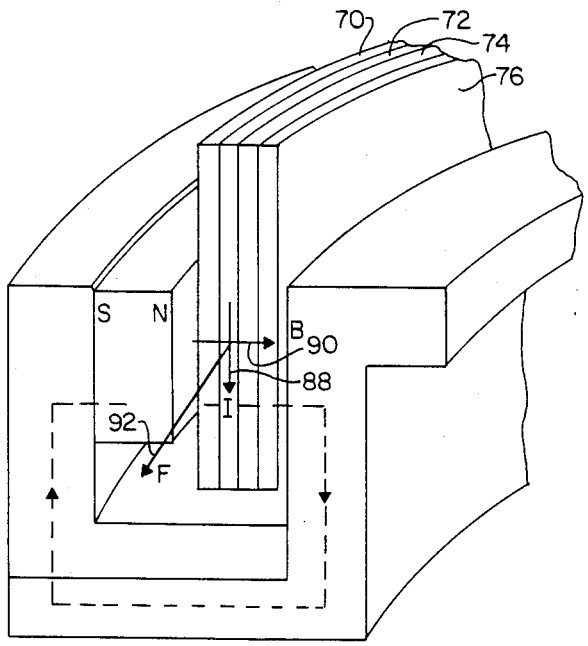
FIG. 3 is a view similar to FIG. 2, showing the generation of one of the radial suspension Lorentz forces.

Coil structure 54, FIG. 2, includes three coils 70, 72 and 74. Coil 70 is the axial suspension coil, while coils 72 and 74 are the X and Y radial suspension coils. The coils are laminated together and mounted to a support cylinder 76 formed of a thin Macor shell. Macor is a machinable glass ceramic and is a registered trademark of Owens Corning Glass Works, Corning, NY. The current, I, flowing in the conductors 71 of axial suspension coil 70 flows in the direction indicated by arrow 82. Since the magnetic field, B, is in the direction indicated by arrow 84, the resulting Lorentz force is in the direction indicated by F, as shown at arrow 86. That force is equal to $\vec{F} = ni\vec{l} \times \vec{B}$ where: $\vec{F}$ is the Lorentz-force (Newtons), n is the number of turns, i is the current (amperes), l is the length (meters) of the conductors that are within the magnetic field and $\vec{B}$ is the flux density (Tesla).

Figure 4:
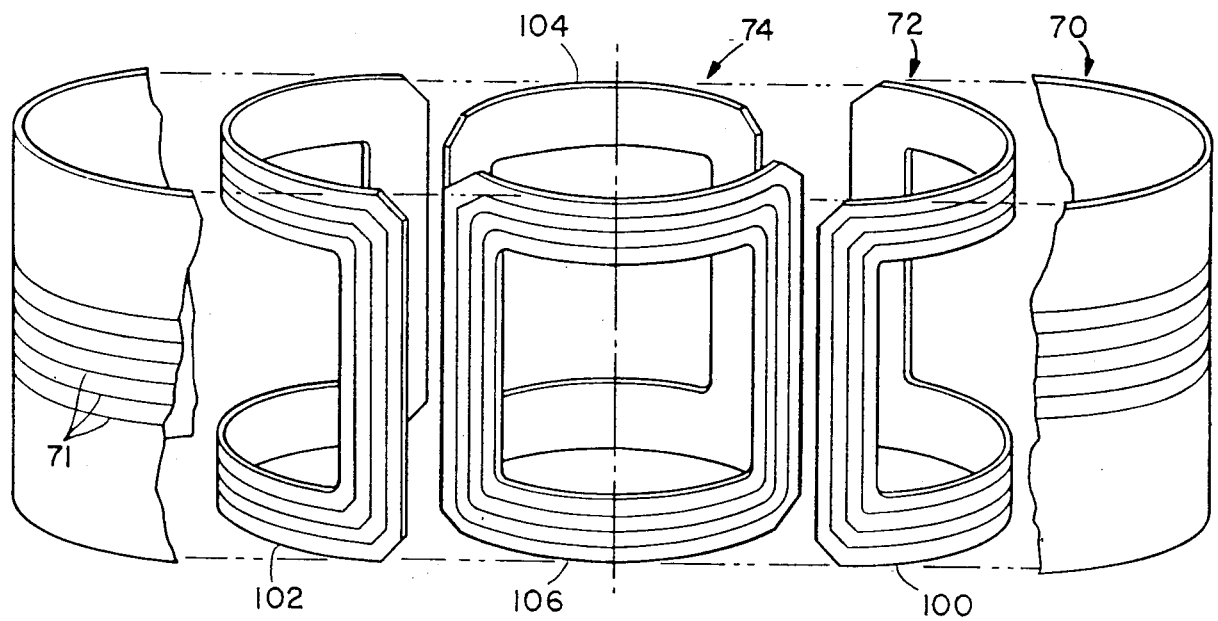
FIG. 4 is an exploded view of the control coils for the magnetic bearings of FIG. 1.
Figure 5:
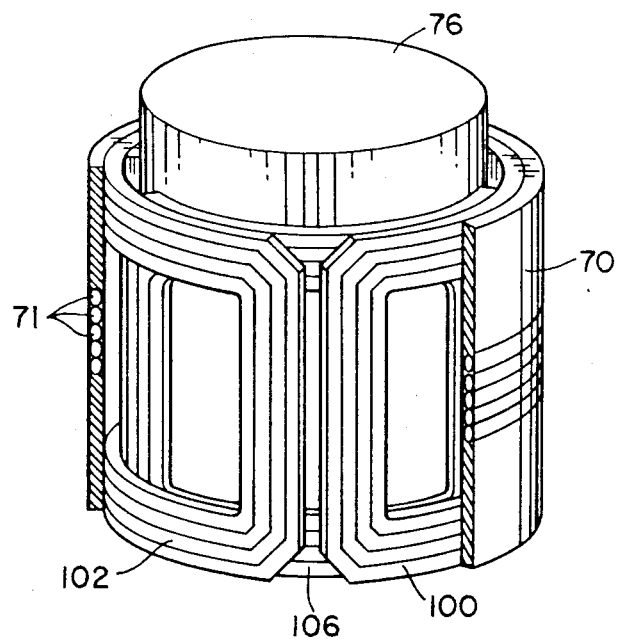
FIG. 5 is a cutaway portion of the control coils in their final assembled form.

In a similar manner, radial suspension coil 72 produces current I in the direction of arrow 88. With the magnetic field B in the direction shown by arrow 90, Lorentz force F is in the direction indicated by arrow 92. The third coil, 74, will have the current I in the same direction as indicated by arrow 88 or in the opposite direction, depending upon which way the magnetic bearing is currently required to apply force. Coil 72 may be designated the X coil and coil 74 the Y coil. The physical construction of the three coils is shown more clearly in FIG. 4, where the X axis coil 72 includes two halves 100 and 102, and the Y axis coil 74 has halves 104 and 106. Surrounding all of those is the Z axis coil, or axial suspension coil, 70. The support structure is eliminated for clarity in FIG. 4 but is shown in FIG. 5, where it appears as a thin-walled support cylinder 76 made of Macor.

Figure 6:
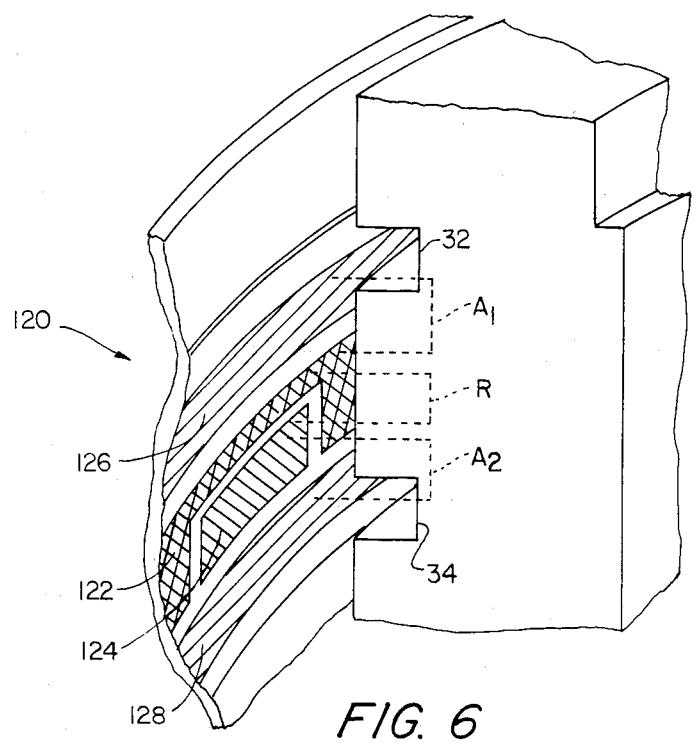
FIG. 6 is a partial broken away view of a sensor used to determine the position of the rotor with respect to the housing.
Figure 9:
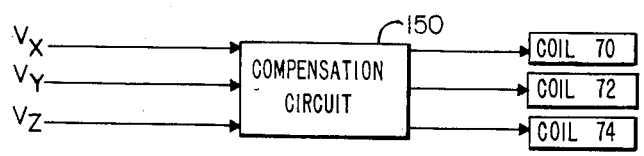
FIG. 9 is a block diagram of the circuit which responds to the voltages generated by FIGS. 7 and 8 to energize the control coils of FIGS. 4 and 5.

A sensor circuit for monitoring the axial position and the radial X, Y position of the rotor with respect to the housing is shown in FIG. 6. The sensor 120 is associated with grooves 32 and 34 and includes three printed circuit areas: the common area 122, the radial area 124, and the axial area in two separate bands 126 and 128. The bands 126 and 128 and area 122 extend completely around the inside of the housing. Area 124 occurs at four positions equally spaced at 90° about the inner wall of the housing. This structure produces two electric fields, $A_1$, $A_2$, which aid in monitoring the axial motion of the rotor, and one electric field R, which serves to monitor the radial motion of the rotor. Through suitable connections, the electric field represented by R in FIG. 6 is schematically shown by capacitor 130. A similar capacitance is developed in a position diametrically opposed to the one shown, and is represented by capacitor 132. An excitation voltage provided by source 134, such as 100 volts RMS at 25 KHz, is provided to the bridge circuit consisting of capacitors 131, 132 and resistors 136 and 138, in the portions of the circuit external to system 10. Any radial motion of the rotor with respect to the housing causes an imbalance in the bridge, shown in FIG. 7, and produces a voltage $V_x$ or $V_y$ representative of the displacement. The circuit in FIG. 7 develops the $V_x$ signal in an identical circuit from the capacitors associated with area 124 and its diametrically opposed area. A similar circuit develops a $V_y$ displacement voltage with respect to the two other areas. The axial fields $A_1$, $A_2$, have associated with them capacitance which is represented by capacitors 140, 142, FIG. 8, which has a similar excitation voltage source 134a, and resistors 136a and 138a. The voltage produced here by bridge imbalance is $V_z$, the axial displacement voltage. The $V_z$, $V_x$, and $V_y$ voltages are provided to a compensation circuit 150, FIG. 9, whose output is delivered selectively to coils 70, 72 and 74 to keep the magnetic bearing system properly aligned.

Other embodiments will occur to those skilled in the art and are within the following claims:

What is claimed is:

1. A magnetic suspension system comprising:
   a first control coil for conducting circumferential current flow, and second and third control coils for conducting axial current flow;
   a support member of magnetic material having a gap for receiving said coils;
   a magnet for producing a magnetic field in said support member through said gap and said coils; and
   means for exciting said coils to interact with the magnetic field and produce Lorentz forces for supporting said coils and said support member relative to each other in the axial and two mutually perpendicular radial directions.

2. The magnetic suspension system of claim 1 in which said magnet is disposed in said gap.

3. The magnetic suspension system of claim 1 in which said magnet is a rare earth cobalt magnet.

4. The magnetic suspension system of claim 1 in which said magnet is mounted on said support member.

5. The magnetic suspension system of claim 4 in which said magnet is disposed in said gap.

6. The magnetic suspension system of claim 1 in which said coils are mounted to stationary structure including a stator of a rotary machine and said support member is mounted to rotating structure including a rotor of said rotary machine.

7. The magnetic suspension system of claim 6 in which said stationary structure includes a housing to which said coils are attached.

8. The magnetic suspension system of claim 6 in which said rotating structure includes a flywheel to which said support member is attached.

9. The magnetic suspension system of claim 1 in which one of said coils and said support member is fixed and the other rotates relative thereto.

10. A rotary-bearing system for a rotary machine comprising:
    two magnetic bearings spaced from each other, each including:
    a first control coil for conducting circumferential current flow, and second and third control coils for conducting axial current flow;
    a support member of magnetic material having a gap for receiving said coils;
    a magnet for producing a magnetic field in said support member through said gap and said coils; and
    means for exciting said coils to interact with the magnetic field and produce Lorentz forces for supporting said coils and said support member relative to each other in the axial and two mutually perpendicular radial directions.

11. A magnetic suspension system comprising:
    a first control coil for establishing circumferential current flow, and second and third control coils for establishing axial current flow;
    a support member of magnetic material having a gap for receiving said coils; and
    a magnet for producing a magnetic field in said support member through said gap and coils for generating, in combination with said circumferential current flow and said axial current flow, Lorentz forces to support said coils and said support member relative to each other in the axial, and two mutually perpendicular radial directions.

12. The magnet supension system of claim 11 in which one of said coils and said support member is fixed and the other rotates relative thereto.

13. The magnetic suspension system of claim 11 in which said coils are mounted to stationary structure including a stator of a rotary machine and said support member is mounted to rotating structure including a rotor of said rotary machine.

14. The magnetic suspension system of claim 11 in which said magnet is disposed in said gap.

15. A magnetic suspension system comprising:
 a first control coil for establishing circumferential current flow, and second and third control coils for establishing axial current flow;
 a support member of magnetic material having a gap for receiving said coils; and
 a magnet for producing a magnetic field in said support member through said gap and coils for generating Lorentz forces to support said coils and said support member relative to each other in the axial, and two mutually perpendicular radial directions.

16. A magnetic suspension system having a moving portion and a stationary portion for producing Lorentz forces to support the portions relative to each other in the axial and two mutually perpendicular radial directions, comprising:
 a first control coil for conducting circumferential current flow, and second and third control coils for conducting axial current flow;
 a support member of magnetic material having a gap for receiving said coils; and
 a magnet for producing a magnetic field in said support member through said gap and said coils.

17. The magnetic suspension system of claim 16 in which said control coils are included in the stationary portion and said support member is included in the moving portion.

* * * * *